May 14, 1957 J. L. FIHE 2,792,319
DRIVE BELTS
Filed Dec. 9, 1953
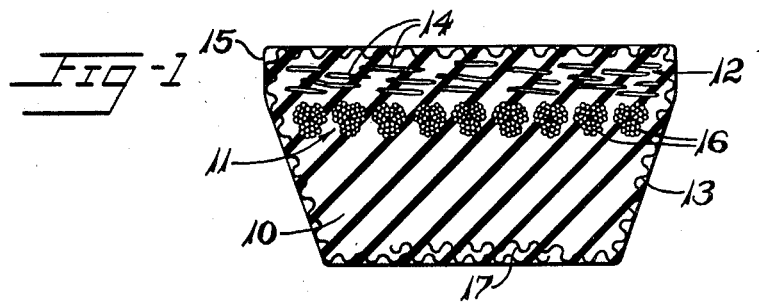
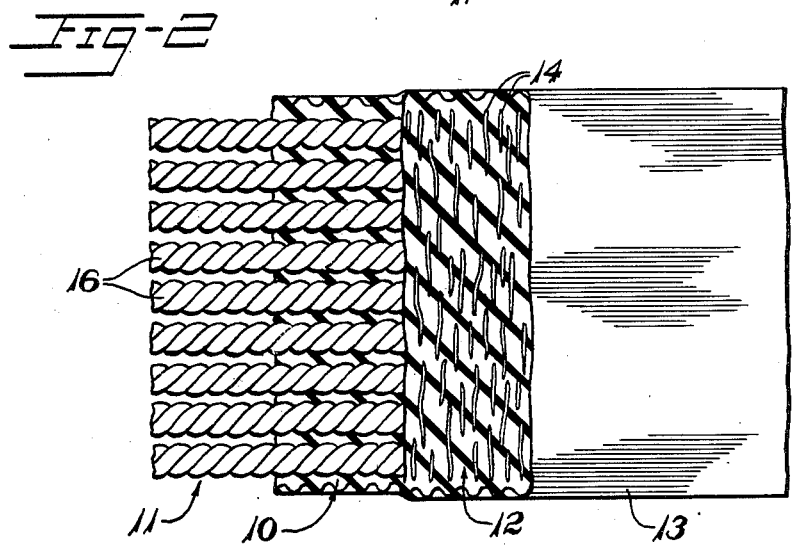
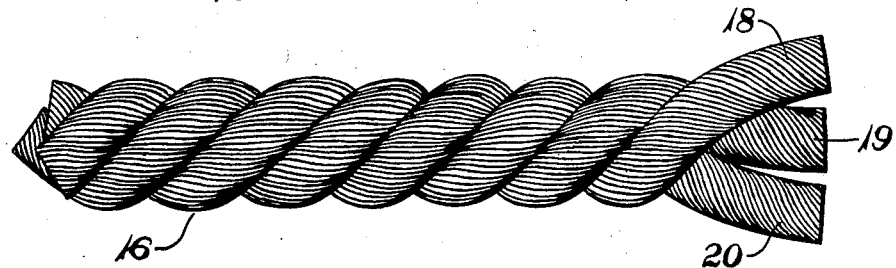
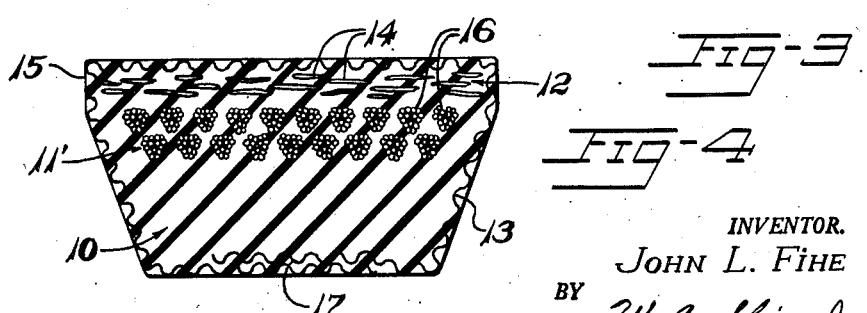
INVENTOR.
JOHN L. FIHE
BY
W. A. Shira, Jr.
ATTY.

United States Patent Office 2,792,319
Patented May 14, 1957

2,792,319

DRIVE BELTS

John L. Fihe, Akron, Ohio, assignor to The B. F. Goodrich Company, New York, N. Y., a corporation of New York Application December 9, 1953, Serial No. 397,109

10 Claims. (Cl. 154—52.2)

This invention relates to drive belts and, more particularly, to an improved construction for such belts whereby production and transmission of vibrations are substantially eliminated.

Belt drives, especially those employing V-belts, frequently create and/or transmit vibrations which are productive of noise and undesirable effects in the apparatus driven thereby. The cause of these vibrations may be due to slight eccentricities of either or both the driving and driven pulleys, unbalance of rotating parts connected thereto, or inequalities in the belt such as variation in width as a result of manufacturing imperfections, splices in the covering fabric, and the like. The variations in width of the belt cause the latter to ride up or down in the grooves of the pulleys thereby producing a pulsating force tending to pull the shafts together. Likewise, eccentricities, lack of balance or other inequalities in the pulleys or the parts connected therewith produce pulsating forces which are transmitted by conventional belts with consequent vibration and noise.

An object of this invention is to provide an improved drive belt such that vibration and noise, in a drive utilizing the belt, are substantially eliminated or at least materially reduced.

Another object of the invention is to provide an improved drive belt in which vibration resulting from inequalities in the width of the belt or lack of symmetry of the driving or driven devices are substantially absorbed by the belt.

A more specific object of the invention is to provide a drive belt having a tension layer formed by a twisted member such that vibrations are substantially absorbed by resilient elongation and contraction of the belt.

A still more specific object of the invention is to provide a drive belt having a tension layer formed by a plurality of parallel portions of a twisted member intermediate the inner and outer peripheries of the belt, said member having a twist multiple in the range of 6.25 to 10.0 and the belt having an elongation, under breaking stress, of 6 to 15%, whereby vibrations in a drive employing the belt are substantially absorbed therein by resilient elongations and contractions of the belt without loss of driving efficiency.

The invention further resides in certain novel features of the construction and arrangements of parts of a drive belt in which the invention is embodied, and further objects and advantages of the invention will be apparent to those skilled in the art to which it pertains from the following description of the present preferred embodiment, and certain modifications thereof, described with reference to the accompanying drawing forming a part of this application and in which:

Fig. 1 is an enlarged cross-sectional view through the presently preferred form of a drive belt embodying the invention;

Fig. 2 is a top view of a portion of the belt illustrated in Fig. 1 with portions of the belt broken away to further illustrate the construction;

Fig. 3 is an elevational view of a portion of the elongated tension member employed in the belt shown in Figs. 1 and 2 with the strands or plies separated to illustrate their twisted relationship; and Fig. 4 is a view similar to Fig. 1 but showing a modified construction embodying the invention.

Referring first to Figs. 1 and 2 of the drawing, it will be seen that the illustrated belt comprises an inner layer 10 of resilient material such as natural or synthetic rubber, a tension layer 11 formed by parallel portions of an elongated twisted member extending longitudinally of the belt, an upper or outer layer 12 of resilient material such as rubber or the like, and a cover 13 of rubberized fabric or similar material surrounding the layers. Preferably the upper or outer layer 12 of the belt here shown has fibers 14 incorporated therein which fibers extend generally transversely of the belt thereby providing lateral strength. The illustrated belt is of the side driving or V-type and has a substantially trapezium cross-section with the upper or outer corners or edges removed, as indicated at 15, so that the portions of the sides of belt adjacent its periphery or face are at substantially right angles to the latter.

A belt of the nature described may be constructed by supporting an annulus of uncured rubber upon a suitable mandrel and then winding in helical form upon this annulus an elongated twisted member 16 which is here shown in the form of a multiple strand twisted cord. This member or cord is preferably coated with a water suspension of resorcinol formaldehyde and latex and dried at an elevated temperature before it is wound upon the annulus, a suitable adhesive being supplied to the member 16 during the winding operation. The upper or outer layer 12 is then applied in sheet form over the tension layer 11 and the uncured assembly divided into separate belts of suitable width by making parallel cuts through the several layers. The sides of these belts are then skived to the desired shape and the entire belt is covered with a strip of fabric impregnated with rubber or the like material, the longitudinally extending lap of this cover fabric being preferably formed on the inner surface of the belt as indicated at 17 in Fig. 1. Thereafter, the belt is placed in a suitable mold and subjected to an elevated temperature, as is well known in the art, thereby effecting curing or vulcanization of the belt so that the several layers are united and integrally bonded together. During this curing operation a small lateral protuberance may result adjacent the region of the end of the strip comprising the cover 13 and this would produce an inequality in the width of the belt at this region. However, by removing the upper or outer corners of the belt, as indicated at 15 in Fig. 1, such projection or protuberance is prevented from contacting the pulleys with which the belt cooperates so that vibration and noise normally resulting from this source are eliminated.

In accordance with this invention the tension member 16, comprising the tension layer 11, is twisted and the ratio of the number of twists per unit length of the member to the cross-sectional dimension thereof is materially higher than in conventional constructions employing cords as reinforcing members. This high twist is preserved during the coating and winding of the member 16 by effecting these operations at substantially zero tension. As a result, the tension layer of the improved belt permits elastic elongation of the belt sufficient to absorb pulsating forces which are productive of vibration and noise. Thus, should the pulleys or shafts of the drive with which the belt is used be eccentric, the belt of this invention can elongate and contract as these eccentricities tend to change the maximum distance across the pulleys thereby absorbing within the belt the forces which would normally tend to move the shafts towards and from each other and which is a frequent cause of vibration and noise in conventional belt drives. Likewise, any inequalities in width of the belt, which would cause the latter to ride up and down in the pulleys and would normally produce vibration, simply cause elastic elongation and contraction of the improved belt so that the latter absorbs, within itself, the vibration and noise producing forces. This elasticity of the belt imparted by the twist of the member 16 comprising the tension layer is kept within predetermined limits so that the driving efficiency of the belt is not affected.

The measure of the twist imparted to the member 16 to provide the aforementioned improvements and advantages may be expressed, in accordance with conventional practice in the art, in terms of the "twist multiple." This is the ratio of the number of twists of the tension member per unit length to the cross-sectional dimension of the member, the relation for textile fibers being: Twist multiple equals the number of twists per inch dividing by the square root of the unit size (cotton equivalent). The term "unit size" in this relationship is the measure commonly employed in the textile art to express the cross-sectional dimension of cotton cord. When the cord employed is nylon, rayon or other material the twist multiple is expressed in the same relationship with the denier measurement of the material converted to its equivalent in the cotton unit scale by the formula which is well known in the textile art.

To more specifically illustrate the nature of the tension layer 11 incorporated in a belt of this invention the following may be given by way of example. A belt was constructed substantially as above described with respect to Figs. 1 and 2 wherein the tension layer was provided by rayon cord of 1650 denier with the cord in the form of three separate strands or plies 18, 19 and 20 (see Fig. 3), each individually twisted in the same direction and with the three plies or strands twisted together in the opposite direction to form the composite member or hawser 16 with the number of twists of the composite member 16 being 5.9 to the inch. This member 16 had a unit size (when converted to the cotton equivalent) of 0.47 and hence the twist multiple of the member was 8.75. The belt thus constructed had an ultimate elongation under breaking stress of 13.2%. In contrast thereto a conventional belt having reinforcing cords provided in the usual manner has a twist multiple in the neighborhood of four and has a materially smaller elongation. In comparison tests with such conventional belts, the belt with the increased twist multiple of the tension layer exhibited material reduction in vibration and noise which characteristic was maintained throughout the life of the belt. Moreover, endurance tests showed that the life of the improved belt had not been reduced.

Construction of belts with tension members having other twist multiples indicate that to provide effective vibration absorption in accordance with this invention requires that the twisted member 16 have a twist multiple in the range of 6.25 to 10.0 with an ultimate elongation of the belt in the range of 6 to 15%. This ultimate elongation of the belt is controlled, at least in part, by maintaining the twist multiple of the member 16 substantially constant throughout the manufacturing of the belt; that is, by not materially elongating the cord during the application of the coating or adhesive thereto or during the winding of the cord in the helical layer 11.

In the preferred embodiment of the invention illustrated in Figs. 1 and 2, the tension layer 11 is provided by a single row of convolutions of the helically wound member 16. However, the principles of the invention may also be incorporated in belts wherein the tension layer comprises more than one row of convolutions of the member 16. Thus, Fig. 4 illustrates a belt wherein the tension layer 11' is formed by two superimposed rows of convolutions of the tension member 16. More than two such rows may be employed under certain circumstances. The other portions of the belt shown in Fig. 4 are the same as those in Fig. 1 and hence bear like numerals.

The invention has, for simplicity, been described and illustrated as it is incorporated in a side driving or V-type belt. It will be apparent, however, that the principles of the invention may also be incorporated in belts of other types such, for example, as flat belts wherein the inner and/or outer surfaces are employed for driving. In such belts the controlled elastic elongation of the tension layer, and hence of the belt, not only serves to eliminate vibrations but also enables the belts to give a better hug on the crown type pulleys normally employed with such belts. It will also be evident that the construction of the belts can be altered from that here illustrated and described in many respects which will be understood by those skilled in the art. Thus, the fibers 14 may be eliminated from the upper layer or upper portion 12 of the belt. Also, more than one ply of covering material 13 may be employed, or in some instance the cover may be entirely eliminated. Likewise, while the invention has been specifically described and illustrated, with reference to use of a tension member of three twisted strands or plies, it will be evident that the tension member may have a greater or lesser number of strands or plies so long as the twist multiple is in the operative range indicated above. In view of these and like modifications in the construction, coming within the purview of this invention, it will be evident that the above detailed description and accompanying drawing are intended only as illustrations of the principles of the invention and not as limitations thereon.

Having thus described the invention, I claim:

1. In a drive belt comprising resilient extensible material, the improvement which comprises an extensible tension layer intermediate the inner and outer peripheries of the belt controlling elongation of the belt, the said layer being formed by elongated multiple strand twisted textile cord having the ratio of the number of twists in a unit length of the cord to the cross-sectional dimension thereof such that the belt has an elongation under breaking stress of 6 to 15 percent.

2. In a drive belt comprising resilient extensible material, the improvement which comprises an extensible tension layer intermediate the inner and outer peripheries of the belt, the said layer being formed by an elongated multiple strand twisted member having a twist multiple in the range of 6.25 to 10.0.

3. In an endless drive belt comprising resilient extensible material, the improvement which comprises an extensible tension layer formed by an elongated multiple strand twisted member disposed in a helix circumferentially of the belt intermediate the inner and outer peripheries thereof, the said member having a twist multiple in the range of 6.25 to 10.0 whereby the resilient elongation and contraction of said belt are increased sufficiently to substantially eliminate vibrations in a drive employing said belt.

4. In an endless drive belt comprising resilient extensible material, the improvement which comprises an extensible tension layer formed by an elongated multiple strand twisted member disposed in a helix circumferentially of the belt intermediate the inner and outer peripheries thereof, the said member having a twist multiple in the range of 6.25 to 10.0 and the said belt having elongation under breaking stress of 6 to 15 percent, whereby vibrations in a drive employing said belt are substantially absorbed therein by resilient elongation and contraction of the belt.

5. A drive belt comprising a layer of resilient material and an extension controlling tension layer extending longitudinally of the first-mentioned layer and integrally united therewith interiorly of the outer surfaces of the belt, the said tension layer being formed by a plurality of parallel portions of an elongated multiple strand twisted member having the ratio of the number of twists in a unit length to the cross-sectional dimension of the member such that the belt has an elongation of 6 to 15 percent under breaking stress.

6. A drive belt comprising a layer of resilient material with an extensible tension layer extending longitudinally of the first-mentioned layer and integrally united therewith interiorly of the outer surfaces of the belt, the said tension layer being formed by a plurality of parallel portions of an elongated multiple strand twisted textile cord having a twist multiple in the range of 6.25 to 10.0.

7. A drive belt comprising an annulus of resilient material containing an extensible tension layer formed by an elongated multiple stand twisted member disposed in a helix circumferentially of said annulus and united therewith interiorly of the outer surface of said annulus, the said member having a twist multiple in the range of 6.25 to 10.0 and the said belt having elongation under breaking stress of 6 to 15 percent.

8. A drive belt comprising inner and outer layers of resilient material with a layer of circumferentially extending parallel convolutions of a multiple strand twisted member bonded therebetween, said member having a twist multiple in the range of 6.25 to 10.0.

9. A drive belt comprising inner and outer layers of resilient material with a layer of circumferentially extending parallel convolutions of an elongated multiple strand twisted member bonded therebetween, said member having the ratio of the number of twists per inch to the square root of the unit size of member, based on its cotton equivalent, in the range of 6.25 to 10.0 and the ultimate elongation of the belt being in the range of 6 to 15 percent.

10. A drive belt having a substantially trapezium cross-section and comprising an inner layer of rubber, an outer layer of rubber with fibers therein extending generally transversely of the circumference of the belt, a layer of circumferentially extending parallel convolutions of an elongated multiple strand twisted member intermediate said layers and integrally united therewith, and a fabric covering completely surrounding said layers and united therewith, the said twisted member having a twist multiple in the range of 6.25 to 10.0 and the elongation of the belt under breaking stress being in the range of 6 to 15 percent whereby vibrations in a drive employing said belt are substantially absorbed therein by resilient elongation and contraction of the belt.

References Cited in the file of this patent

UNITED STATES PATENTS

| | | |
|---|---|---|
| 2,064,781 | Collins | Dec. 15, 1936 |
| 2,075,777 | Brownell | Mar. 30, 1937 |
| 2,281,148 | Freedlander | Apr. 28, 1942 |